(12) United States Patent
Luo et al.

(10) Patent No.: US 9,363,807 B2
(45) Date of Patent: Jun. 7, 2016

(54) METHOD AND APPARATUS FOR SENDING AND RECEIVING A DOWNLINK DATA BLOCK OF A PACKET DATA SERVICE

(71) Applicant: Huawei Technologies Co., Ltd., Shenzhen (CN)

(72) Inventors: Chao Luo, Shanghai (CN); Jiehua Xiao, Shanghai (CN); Honglin Chai, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 51 days.

(21) Appl. No.: 14/308,216

(22) Filed: Jun. 18, 2014

(65) Prior Publication Data

US 2014/0301318 A1    Oct. 9, 2014

Related U.S. Application Data

(63) Continuation of application No. PCT/CN2012/085891, filed on Dec. 5, 2012.

(30) Foreign Application Priority Data

Feb. 3, 2012 (CN) .......................... 2012 1 0024424

(51) Int. Cl.
*H04W 72/04* (2009.01)
*H04L 5/00* (2006.01)

(52) U.S. Cl.
CPC ........... *H04W 72/042* (2013.01); *H04L 5/0007* (2013.01); *H04L 5/0062* (2013.01); *H04L 5/0064* (2013.01); *H04L 5/0071* (2013.01)

(58) Field of Classification Search
None
See application file for complete search history.

(56) References Cited

U.S. PATENT DOCUMENTS

| 6,456,627 | B1 | 9/2002 | Frodigh et al. |
| 7,535,860 | B2 | 5/2009 | Park et al. |
| 8,179,876 | B2 | 5/2012 | Agrawal et al. |
| 2002/0123370 | A1* | 9/2002 | Berg ................... H04B 7/0408 455/562.1 |
| 2006/0087997 | A1 | 4/2006 | Li |
| 2009/0197587 | A1* | 8/2009 | Frank ................ H04W 72/1257 455/422.1 |
| 2009/0232158 | A1* | 9/2009 | Frank ...................... H04W 8/30 370/466 |
| 2010/0322338 | A1* | 12/2010 | Sundberg .............. H04L 1/0072 375/269 |

(Continued)

FOREIGN PATENT DOCUMENTS

| CN | 1277761 A | 12/2000 |
| CN | 1538652 A | 10/2004 |

(Continued)

*Primary Examiner* — Donald Mills
(74) *Attorney, Agent, or Firm* — Slater Matsil, LLP

(57) ABSTRACT

The present disclosure relates to a method and an apparatus for sending and receiving a downlink data block of a packet data service. A network side adds indication information of downlink data modulation modes to a downlink data block, where the downlink data block includes first information and second information; the network performs symbol mapping processing on the first information by using a first modulation mode to obtain a first modulated signal; the network performs symbol mapping processing and data pre-processing on the second information by using a second modulation mode to obtain a second modulated signal; the network combines these two modulated signals to obtain an aggregate modulated signal; and the network sends the aggregate modulated signal. With the present disclosure, throughput of downlink data is increased while a USF compatibility between more types of low-capability mobile terminals is considered.

16 Claims, 4 Drawing Sheets

(56) References Cited

U.S. PATENT DOCUMENTS

2012/0051332 A1\* 3/2012 Hole .................... H04J 3/1694
                                                        370/336
2013/0294319 A1\* 11/2013 Haapaniemi ........ H04W 72/121
                                                        370/312
2014/0050151 A1\* 2/2014 Riddington ........... H04W 24/10
                                                        370/328

FOREIGN PATENT DOCUMENTS

| CN | 101120521 A | 2/2008 |
|----|-------------|--------|
| CN | 101610144 A | 12/2009 |
| CN | 101946440 A | 1/2011 |
| WO | 9912281 | 3/1999 |
| WO | 2009102270 A1 | 8/2009 |

\* cited by examiner

METHOD AND APPARATUS FOR SENDING AND RECEIVING A DOWNLINK DATA BLOCK OF A PACKET DATA SERVICE

CROSS-REFERENCE TO RELATED APPLICATIONS

This application is a continuation of International Application No. PCT/CN2012/085891, filed on Dec. 5, 2012, which claims priority to Chinese Patent Application No. 201210024424.2, filed on Feb. 3, 2012, both of which are hereby incorporated by reference in their entireties.

TECHNICAL FIELD

The present disclosure relates to the field of wireless communications, and in particular, to a method and an apparatus for sending and receiving a downlink data block of a packet data service.

BACKGROUND

In packet data services of a GSM EDGE radio access network (GSM EDGE Radio Access Network, GERAN), due to a relatively independent uplink and downlink resource allocation mode, the uplink resource allocation is addressed by using an uplink state flag (Uplink State Flag, USF), and the downlink resource allocation is addressed by using a temporary flow identity (Temporary Flow Identity, TFI). The uplink resource allocation of a mobile station (Mobile Station, MS) is controlled by using the USF carried in a downlink data block, that is, a downlink data block sent by a network side of the communication system to the MS includes both USF information and downlink data information.

In the prior art, when a modulation and coding capability of a mobile terminal scheduled by the USF information is different from a modulation and coding capability of a mobile terminal corresponding to the downlink data information, a downlink data block is sent by using a modulation and coding scheme (Modulation and coding scheme, MCS) supported by a mobile terminal with a poorer modulation and coding capability. In case that the data information part can use a higher-order modulation mode than the USF part, this sending method loses the flexibility of higher-order modulation on the data information part, thereby reducing throughput of downlink data.

SUMMARY

Embodiments of the present disclosure provide a method and an apparatus for sending and receiving a downlink data block of a packet data service, so that the capability of sending downlink data may be maximized while a USF compatibility between more types of low-capability mobile terminals is considered, thereby increasing throughput of downlink data.

In one aspect, an embodiment of the present disclosure provides a method for sending a downlink data block of a packet data service, where the method includes:
adding indication information of a data information modulation mode to the downlink data block, where the downlink data block includes first information and second information;
performing symbol mapping processing on the first information by using a first modulation mode to obtain a first modulated signal; and performing symbol mapping processing on the second information by using a second modulation mode and further performing data pre-processing to obtain a second modulated signal, where the indication information is used to indicate the second modulation mode;
combining the first modulated signal and the second modulated signal to obtain an aggregate modulated signal; and
sending the aggregate modulated signal.

In another aspect, an embodiment of the present disclosure provides a method for receiving a downlink data block of a packet data service, where the method includes:
receiving an aggregate modulated signal, where the aggregate modulated signal includes a first modulated signal and a second modulated signal;
detecting and obtaining a first symbol rate and a first modulation mode of the first modulated signal, and demodulating the first modulated signal according to the first modulation mode and the first symbol rate to obtain first information;
detecting and obtaining a second symbol rate and a second modulation mode of the second modulated signal, and demodulating the second modulated signal according to the second modulation mode and the second symbol rate to obtain second information; and
decoding the first information and the second information to obtain the downlink data block.

In another aspect, an embodiment of the present disclosure provides an apparatus for sending a downlink data block of a packet data service, where the apparatus includes:
an information inserting unit, configured to add indication information of a data information modulation mode to the downlink data block, where the downlink data block includes first information and second information;
a modulating unit, configured to perform symbol mapping processing on the first information by using a first modulation mode to obtain a first modulated signal, and perform symbol mapping processing on the second information by using a second modulation mode and further perform data pre-processing to obtain a second modulated signal, where the indication information is used to indicate the second modulation mode;
a combining unit, configured to combine the first modulated signal and the second modulated signal to obtain an aggregate modulated signal; and
a sending unit, configured to send the aggregate modulated signal.

In another aspect, an embodiment of the present disclosure provides an apparatus for receiving a downlink data block of a packet data service, where the apparatus includes:
a receiving unit, configured to receive an aggregate modulated signal, where the aggregate modulated signal includes a first modulated signal and a second modulated signal;
a first demodulating unit, configured to detect and obtain a first symbol rate and a first modulation mode of the first modulated signal, and demodulate the first modulated signal according to the first modulation mode and the first symbol rate to obtain first information;
a second demodulating unit, configured to detect and obtain a second symbol rate and a second modulation mode of the second modulated signal, and demodulate the second modulated signal according to the second modulation mode and the second symbol rate to obtain second information; and
a decoding unit, configured to decode the first information and the second information to obtain the downlink data block.

In embodiments of the present disclosure, a network side of the communication system adds indication information of a data information modulation mode to a downlink data block, where the downlink data block includes first information and second information; the network side of the communication system performs symbol mapping processing on the first information by using a first modulation mode to obtain a first modulated signal; the network side of the communication system performs symbol mapping processing on the second information by using a second modulation mode and further performs data pre-processing to obtain a second modulated signal, where the indication information is used to indicate the second modulation mode; the network side of the communication system combines the first modulated signal and the second modulated signal to obtain an aggregate modulated signal; and the network side of the communication system sends the aggregate modulated signal. A mobile terminal receives an aggregate modulated signal, where the aggregate modulated signal includes a first modulated signal and a second modulated signal; the mobile terminal detects and obtains a first symbol rate and a first modulation mode of the first modulated signal, and demodulates the first modulated signal according to the first modulation mode and the first symbol rate to obtain first information; the mobile terminal detects and obtains a second symbol rate and a second modulation mode of the second modulated signal, and demodulates the second modulated signal according to the second modulation mode and the second symbol rate to obtain second information; and the mobile terminal decodes the first information and the second information to obtain a downlink data block. Therefore, with the present disclosure, the capability of sending downlink data may be maximized while a USF compatibility between more types of low-capability mobile terminals is considered, thereby increasing throughput of downlink data.

DESCRIPTION OF EMBODIMENTS

In embodiments of the present disclosure, a network side of the communication system adds indication information of a data information modulation mode to a downlink data block, where the downlink data block includes first information and second information; the network side of the communication system performs symbol mapping processing on the first information by using a first modulation mode to obtain a first modulated signal; the network side of the communication system performs symbol mapping processing on the second information by using a second modulation mode and further performs data pre-processing to obtain a second modulated signal, where the indication information is used to indicate the second modulation mode; the network side of the communication system combines the first modulated signal and the second modulated signal to obtain an aggregate modulated signal; and the network side of the communication system sends the aggregate modulated signal. A mobile terminal receives an aggregate modulated signal, where the aggregate modulated signal includes a first modulated signal and a second modulated signal; the mobile terminal detects and obtains a first symbol rate and a first modulation mode of the first modulated signal, and demodulates the first modulated signal according to the first modulation mode and the first symbol rate to obtain first information; the mobile terminal detects and obtains a second symbol rate and a second modulation mode of the second modulated signal, and demodulates the second modulated signal according to the second modulation mode and the second symbol rate to obtain second information; and the mobile terminal decodes the first information and the second information to obtain a downlink data block. Therefore, with the present disclosure, the capability of sending downlink data may be maximized while a USF compatibility between more types of low-capability mobile terminals is considered, thereby increasing throughput of downlink data.

The technical solution of the present disclosure is hereinafter described in detail with reference to accompanying drawings and embodiments.

Figure 1:
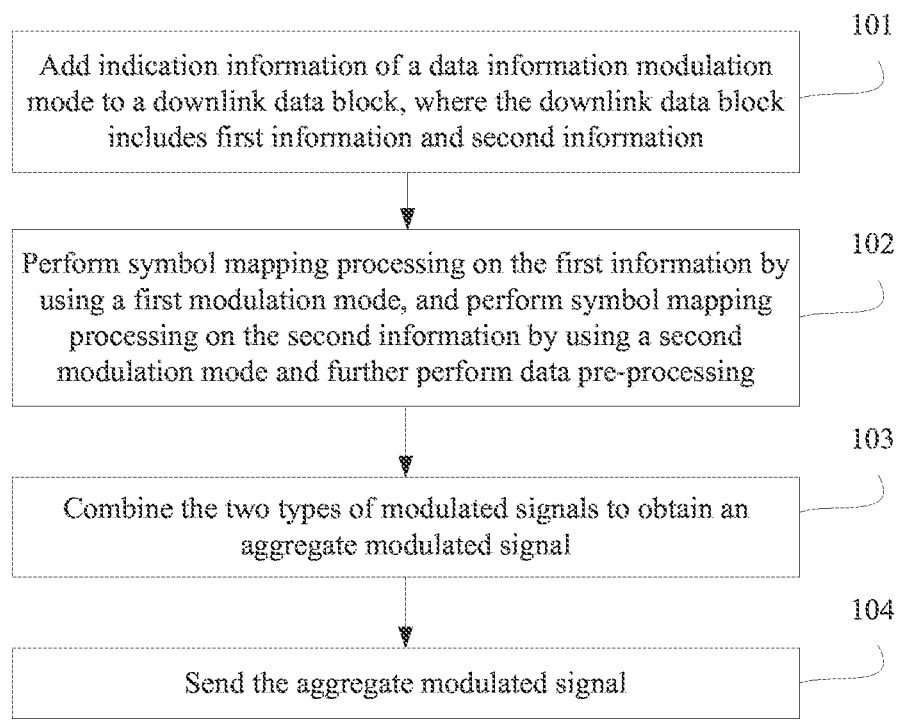
FIG. 1 is a flowchart of a method for sending a downlink data block of a packet data service according to an embodiment of the present disclosure.

FIG. 1 is a flowchart of a method for sending a downlink data block of a packet data service according to an embodiment of the present disclosure. As shown in FIG. 1, this embodiment includes the following steps:

Step 101: A network side of the communication system adds indication information of a data information modulation mode to a downlink data block, where the downlink data block includes first information and second information.

The downlink data block includes not only downlink data information but also uplink state flag USF information.

Bit errors easily occur during the transmission of digital signals, so that phenomena such as illegible characters occur on a receiver. Channel coding processing is performed on digital code streams to ensure the system has a certain error correction capability and anti-interference capability, which may greatly avoid the occurrence of bit errors in the transmission of code streams.

In this embodiment, downlink data information includes Data information and Header information. During the channel coding process, indication information of modulation modes in the data information is inserted into a downlink data block. The receiver may detect types of modulation modes used by the data information according to the indication information of the data information modulation mode.

After encoding the downlink data block, the network side of the communication system inserts successive training sequence information in the middle of the first information of the downlink data block to form an initial Burst structure.

There are two types of Burst structures: one type is Burst structure with a low symbol rate, that is, a Level-A Burst structure; for the Level-A Burst structure, the training sequence TS information occupies positions of 26 symbols; the other is Burst structure with a higher symbol rate, that is, a Level-B Burst structure; for the Level-B Burst structure, the training sequence TS information occupies positions of 31 symbols. The training sequence information is located in the middle of the downlink data block.

Figure 2:
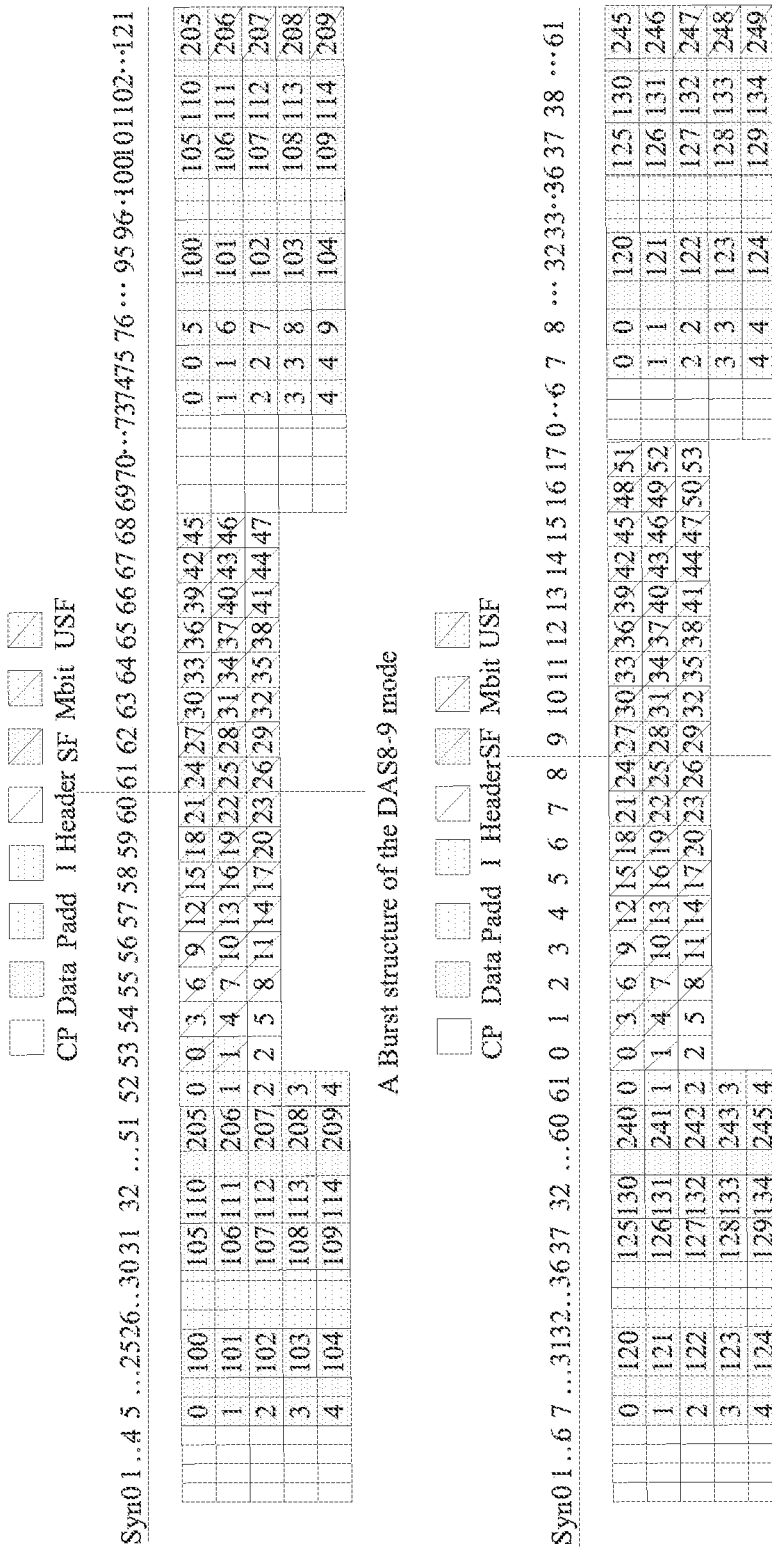
FIG. 2 is schematic diagram of a Burst structure used in a transmission of downlink data bocks of packet data services and obtained after an initial Burst structure has been processed according to an embodiment of the present disclosure.

FIG. 2 is schematic diagram of a Burst structure used in a transmission of downlink data bocks of packet data services and obtained after an initial Burst structure has been processed according to an embodiment of the present disclosure. As shown in FIG. 2:

First information refers to information that does not need to be pre-processed, where the pre-processing refers to inverse discrete Fourier transform (IDFT) processing or inverse discrete cosine transform (IDCT) processing or inverse discrete wavelet transform (IDWT) processing. This embodiment is based on the inverse discrete Fourier transform processing. Because the Fourier transform refers to transform from a frequency domain to a time domain, signals before being pre-processed may be called frequency domain signals, while signals after being transformed are called time domain signals. The purpose of the pre-processing is to transform frequency domain signals into time domain signals. The first information is time domain signals, and thus does not need to be pre-processed. The first information is located in the middle of the Burst structure, including uplink state flag USF information and stealing flag SF information, and further including Header information. The first information is mainly used to carry the uplink state flag information. Therefore, a first modulation mode used by the first information is determined according to a capability of a mobile terminal scheduled by the USF information. If the mobile terminal scheduled by the USF information is an EGPRS terminal, the first modulation mode may be an 8PSK modulation mode, that is, 3-bit information is transmitted in a symbol period, which is indicated by three lines of data in the figure. The first information further includes training sequence TS information. In the middle of the first information, that is, a position indicated by black lines in the middle of FIG. 2, the training sequence TS information occupies 26 or 31 symbol positions. Because the position of the training sequence TS information in the Burst structure is easily described, the position of the training sequence is not indicated in FIG. 2.

Preferentially, the first information may also include indication information of a second modulation mode. The indication information of the second modulation mode may be placed at the position of the first information completely, that is, in the middle of the Burst structure; the indication information of the second modulation mode may also be placed at the position of the second information completely, that is, at both sides of the Burst structure; or one part of the indication information may be placed at the position of the first information, and the other part may be placed at the position of the second information. In FIG. 2, in a Level-A structure, the indication information of the second modulation mode is located at the positions of symbols 52 and 74; in a Level-B structure, the indication information of the second modulation mode is located at the positions of symbols 61 and 7. One part of the indication information of the second modulation mode may be located at the position of the first information, and the other part may be located at the position of the second information.

The second information refers to information to be pre-processed and is located on the left and right sides of the Burst structure, including downlink Data information, Padding information, Mbit information, and indication information I of the second modulation mode. The second information is mainly used to carry the data information, and thus the second modulation mode is determined according to a capability of a mobile terminal corresponding to the downlink data. If the home mobile terminal of the data information is a PGE2 mobile terminal, the second modulation mode may be 16QAM, 32QAM, and 64QAM. In FIG. 2, the modulation mode used by the second information may be 32QAM modulation mode, that is, 5-bit information is transmitted in a symbol period, which is indicated by five rows of data in FIG. 2.

In addition, the second information may further include the Header information.

In the embodiment of the present disclosure, the indication information of the second modulation mode is indicated by using symbols. Two symbols with the largest Euclidean distance are selected to represent 0 (symbol a) and 1 (symbol b). The indication information of the second modulation mode is indicated by using the two symbols, and four states, namely, (0, 0), (0, 1), (1, 0), (1, 1) may be obtained by determining whether the two symbols are symbol a or symbol b. The four states may correspond to four modulation modes, respectively, as shown in Table 1.

TABLE 1

| Symbol level | | Bit level | | |
|---|---|---|---|---|
| I1 | I2 | I1 | I2 | Modulation mode |
| 0 | 0 | 0011 | 0011 | 16 QAM |
| 0 | 1 | 0011 | 1111 | 32 QAM |
| 1 | 0 | 1111 | 0011 | 64 QAM |
| 1 | 1 | 1111 | 1111 | |

It should be noted that in a Burst structure of the DBS9 illustrated in FIG. 2, the symbol rate of the first information is different from the symbol rate of the second information, that is, each symbol occupies different time. Therefore, the number of symbols in the Burst structure of the DBS9 illustrated in FIG. 2 is different from the number of symbols in the Burst structure of an old EGPRS2 level-B Burst structure. However, the length of time occupied by the Burst structure of the DBS9 in the embodiment of the present disclosure is the same as the length of time occupied by the old EGPRS2 Burst structure.

For example, in a new level-A Burst structure, an NSR (Normal Symbol Rate, normal symbol rate) is used completely. Therefore, the number of symbols is equal to the number of symbols in the old EGPRS2 level-A Burst structure respectively and so is the total length of time. If the GP length is not considered, the number of symbols is 148 (=122+26).

However, in a new level-B Burst structure, an HSR (Higher Symbol Rate, higher symbol rate) may be used at both sides, while an NSR (Normal Symbol Rate, normal symbol rate) is used in the middle; because the time occupied by a symbol of the NSR rate is nearly 1.2 times as many as the time occupied by a symbol of the HSR rate, the total length of time (symbol time at the HSR is normalized) in the new burst structure is 177=62×2+(18+26)×1.2.

FIG. 2 illustrates only two types of Burst structures where time and frequency are mixed, but is not intended to limit the protection scope of the present disclosure. Different Burst structures may be available according to different modulation modes. Any modification, equivalent replacement, or improvement made without departing from the spirit and principle of the present disclosure should fall within the protection scope of the present disclosure.

Step 102: The network side of the communication system performs symbol mapping processing on the first information by using the first modulation mode to obtain a first modulated signal and performs symbol mapping processing on the second information by using the second modulation mode and further performs data pre-processing to obtain a second modulated signal, where the indication information is used to indicate the second modulation mode.

The first information refers to information that does not need to undergo data pre-processing; if the pre-processing is the inverse discrete Fourier transform, the first information may be called time domain signals; the second information refers to information that needs to undergo data pre-processing; if the pre-processing is the inverse discrete Fourier transform, the second information may be called frequency domain signals.

The first modulation mode is determined according to the capability of a mobile terminal scheduled by the uplink state flag USF information; if the mobile terminal scheduled by the USF information is an EGPRS terminal, the first modulation mode may be an 8PSK modulation mode. When the first modulation mode is the 8 phase shift keying 8PSK mode, the network side of the communication system performs symbol mapping on the first information by using the 8PSK modulation mode, and modulates the first information into an 8PSK symbol. Because the amplitude of the 8PSK symbol is not constant, after symbol mapping is performed on the first information, symbol rotation needs also be performed on the 8PSK symbol to avoid a vibrant amplitude change. After symbol mapping and symbol rotation processing are performed on the first information, a first modulated signal is obtained.

The second modulation mode is determined according to the capability of the home mobile terminal of the data information. This embodiment is based on an assumption that the second modulation mode is quadrature amplitude modulation 32QAM mode. The network side of the communication system performs symbol mapping on the second information by using the 32QAM modulation mode; after transforming the second information into a 32QAM symbol, the network side of the communication system further performs data pre-processing on the 32QAM symbol. This pre-processing mode may be inverse discrete Fourier transform, inverse discrete cosine transform, or inverse discrete wavelet transform. This embodiment is based on the inverse discrete Fourier transform. Because the inverse discrete Fourier transform is a transform from a frequency domain to a time domain, signals before being pre-processed are called frequency domain signals, while signals after being transformed are called time domain signals. The pre-processing process refers to as follows: a frequency domain signal is transformed into a time domain signal; cyclic prefix CP information of a certain length is added to the obtained time domain signal to obtain a second modulated signal. The purpose of adding the cyclic prefix information is to overcome inter-symbol interference due to a channel extension. The following two methods may be used to perform inverse discrete Fourier transform processing on the second information after the symbol mapping processing is performed and insert the cyclic prefix CP information: one method is performing inverse discrete Fourier transform processing on the left and right parts, that is, positions of symbols 0 to 52 and positions of symbols 69 to 121 in the Burst structure of DAS8-9 mode illustrated in FIG. 2, of the second information that has undergone the symbol mapping processing respectively, and inserting the cyclic prefix CP information to the left and right parts respectively; the second method is performing inverse discrete Fourier transform processing on the left and right parts of the second information that has undergone the symbol mapping processing together, and inserting the cyclic prefix CP information to the left and right parts of the second information respectively. The cyclic prefix CP information may also be inserted to only one side of the second information according to situations.

Step 103: The network side of the communication system combines the first modulated signal and the second modulated signal to obtain an aggregate modulated signal.

After combining the first modulated signal and the second modulated signal, the network side of the communication system adds guard period GP information and performs pulse forming. The purpose of inserting the guard period information is to provide a certain time interval for a handset or the network to increase and reduce power at the boundary of the Burst structure.

The network side of the communication system can perform pulse forming on the first modulated signal and the second modulated signal by using a pulse forming filter.

Step 104: The network side of the communication system sends the aggregate modulated signal.

For the first modulated signal and the second modulated signal in the aggregate modulated signal, the network side of the communication system may send them by using different symbol rates. The network side of the communication system sends the first modulated signal that has undergone the pulse forming in the aggregate modulated signal by using a first symbol rate, and sends the second modulated signal that has undergone the pulse forming in the aggregate modulated signal by using a second symbol rate.

The first symbol rate is determined according to the symbol rate support capability of the mobile terminal scheduled by the uplink state flag information, and the second symbol rate is determined according to the symbol rate support capability of the mobile terminal corresponding to the data information. The first symbol rate and the second symbol rate may be the same. In the level-A structure, the first symbol rate and the second symbol rate are the same, that is, they all uses a normal symbol rate NSR; in the level-B structure, the first symbol rate and the second symbol rate may be different, that is, the first symbol rate may be the NSR, and the second symbol rate may be a higher symbol rate HSR, where the second symbol rate is nearly 1.2 times as many as the first symbol rate.

It should be noted that the EGPRS2A mobile terminal maximally supports a 32QAM modulation mode and a symbol rate NSR; the EGPRS2B mobile terminal maximally support a 32QAM modulation mode and a symbol rate NSR or HSR; the PGE2 mobile terminal maximally supports a 64QAM modulation mode and a symbol rate NSR or HSR and supports pre-processing and demodulation.

The network side of the communication system sends a radio frequency signal, so that after a receiver, for example, the mobile terminal receives and demodulates the radio frequency signal, the receiver may demodulate the aggregate modulated signal sent by the network side of the communication system into raw digital signals and perform corresponding processing according to demodulated digital signals.

In the embodiment of the present disclosure, a network side of the communication system adds indication information of a data information modulation mode to a downlink data block, where the downlink data block includes first information and second information; the network side of the communication system performs symbol mapping processing on the first information by using a first modulation mode to obtain a first modulated signal; the network side of the communication system performs symbol mapping processing on the second information by using a second modulation mode and further performs data pre-processing to obtain a second modulated signal, where the indication information is used to indicate the second modulation mode for a mobile terminal; the network side of the communication system combines the first modulated signal and the second modulated signal to obtain an aggregate modulated signal; and the network side of the communication system sends the aggregate modulated signal. The network side of the communication system modulates the information in the downlink data block by using different modulation modes, so that the capability of sending downlink data is maximized while a USF compatibility between more types of low-capability mobile terminals is considered, thereby increasing throughput of downlink data.

Figure 3:
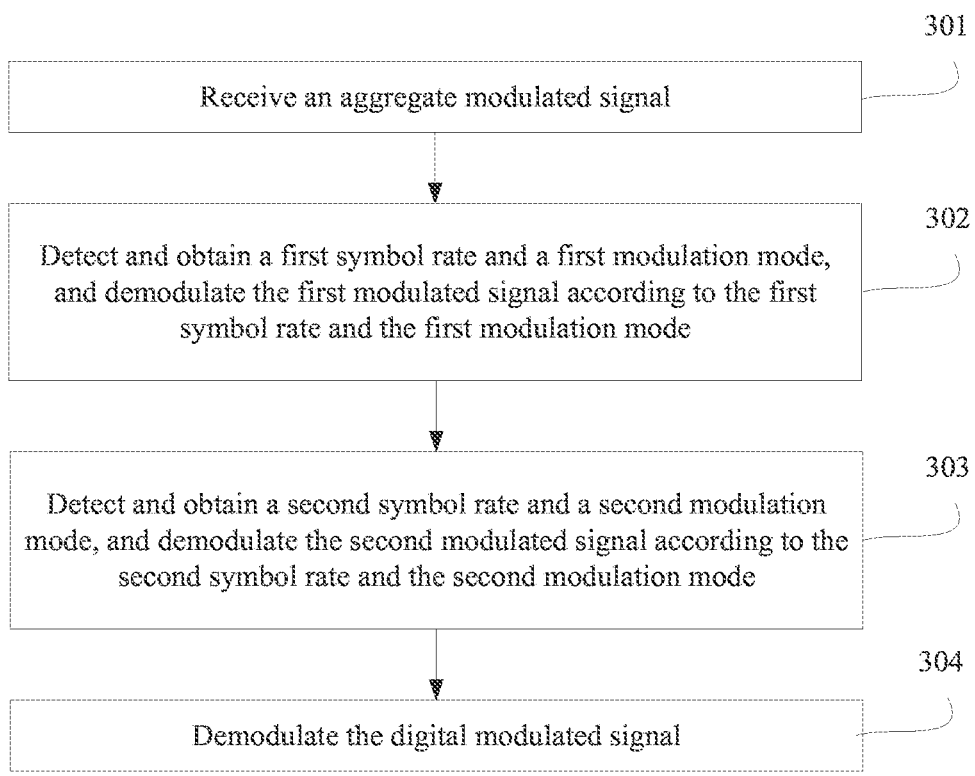
FIG. 3 is a flowchart of a method for receiving a downlink data block of a packet data service according to an embodiment of the present disclosure.

The foregoing embodiment describes how the network side of the communication system modulates digital signals. The following embodiment describes a process of demodulating received digital signals into raw digital signals by a mobile terminal. FIG. 3 is a flowchart of a method for receiving a downlink data block of a packet data service according to an embodiment of the present disclosure. As shown in FIG. 3, this embodiment includes the following steps:

Step 301: A mobile terminal receives an aggregate modulated signal, where the aggregate modulated signal includes a first modulated signal and a second modulated signal.

The aggregate modulated signal includes a first modulated signal and a second modulated signal, where the first modulated signal includes training sequence information and USF information and the second modulated signal includes a modulated signal of Data information.

Step 302: The mobile terminal detects and obtains a first symbol rate and a first modulation mode of the first modulated signal, and demodulates the first modulated signal according to the first modulation mode and the first symbol rate to obtain first information.

After receiving the first modulated signal, the mobile terminal blindly detects the first symbol rate and the first modulation mode of the first modulated signal according to the training sequence information and in the first modulated signal and different symbol rotation angles. This is the same as a blind detection mode in the EGPRS2 of the prior art.

The first information may be obtained by demodulating the first modulated signal according to the obtained first modulation mode and first symbol rate.

Step 303: The mobile terminal detects and obtains a second symbol rate and a second modulation mode of the second modulated signal, and demodulates the second modulated signal according to the second modulation mode and the second symbol rate to obtain second information.

The detecting and obtaining a second symbol rate and a second modulation mode of the second modulated signal, and demodulating the second modulated signal according to the second modulation mode and the second symbol rate to obtain second information is specifically: the second modulated signal is demodulated by using a symbol rate and a corresponding demodulation mode to obtain a first predicted value of the second information; the second modulated signal is demodulated by using another symbol rate and a corresponding demodulation mode to obtain a second predicted value of the second information; a first evaluation metric value is obtained according to the first predicted value, a first frequency domain signal, and a first frequency domain channel factor; a second evaluation metric value is obtained according to the second predicted value, another frequency domain signal, and another frequency domain channel factor; the first evaluation metric value and the second evaluation metric value are compared to obtain an evaluation metric value; a predicted value corresponding to the evaluation metric value is second information.

A time domain channel factor $h=[h_1 h_2 \ldots h_l]$ is firstly estimated according to the training sequence information in the first modulated signal.

Assume the second modulated signal is sent by using the NSR, Fourier transform of an N1 point is performed on the time domain channel factor h to obtain a first frequency domain channel factor $H_A=FFT_{N1}[h]$, where the FFT refers to fast Fourier transform (Fast Fourier Transform) and is a fast calculation of the Fourier transform. N1 refers to a FFT transform length when the rate of the second modulated signal is the NSR. The second modulated signal is sampled according to the NSR symbol rate, and the cyclic prefix CP information is eliminated to obtain $s_A=s_{A\_1}, s_{A\_2} \ldots s_{A\_n*N1}$, and Fourier transform is performed to transform the second modulated signal into a first frequency domain signal $s_A=FFT_{N1}[s_A]$. In the level-A Burst structure, as shown in FIG. 2, code information of the second modulation mode is located at positions of symbols 52 and 74, and the corresponding second modulation mode Mod_A may be detected at the positions of symbols 52 and 74 of the frequency domain signal. The frequency domain signal is demodulated by using the obtained second modulation mode Mod_A to obtain a first predicted value of the second information $X_A$. A first evaluation metric value is calculated according to the obtained first predicted value of the second information $X_A$, the first frequency domain signal $S_A$, and the first frequency domain channel factor $H_A$, where the evaluation metric value may be a noise variance $\sigma_A=var[Y_A-X_A]$, where $Y_A=S_A/H_A$. In addition, this metric value may be a mean square error, a signal-to-noise ratio, and the like. Different selections of the evaluation metric value may be called different evaluation criteria.

Assume the second modulated signal is sent by using the NSR, Fourier transform of an N2 point is performed on a time domain channel factor h to obtain another frequency domain channel factor $H_B=FFT_{N2}^{[h]}$. $N2$ refers to a FFT transform length when the rate of the second modulated signal is the NSR. The second modulated signal is sampled according to the HSR symbol rate, and the cyclic prefix CP information is eliminated to obtain $s^B=s_{B\_1}, s_{B\_2} \ldots s_{B\_n*N2}$, and Fourier transform is performed to transform the second modulated signal into another frequency domain signal $S_B=FFT_{N2}[S_B]$. In the level-B Burst structure, code information of the second modulation is located at positions of symbols 52 and 74, and the corresponding second modulation mode Mod_B may be detected at the positions of symbols 61 and 7 of the frequency domain signal. The frequency domain signal is demodulated by using the obtained second modulation mode Mod_B to obtain a second predicted value of the second information $X_B$. A second evaluation metric value relative to the first evaluation metric value is calculated according to the obtained second predicted value of the second information $X_B$, the another frequency domain signal $S_B$, and the another frequency domain channel factor $H_B$. When the first evaluation metric value is a noise variance, the second evaluation metric value is also a noise variance $\sigma_a=var[Y_B-X_B]$, where $Y_B=S_B/H_B$. When the first evaluation metric value is a mean square error or a signal-to-noise ratio, the second evaluation metric value is also a mean square error or a signal-to-noise ratio.

Different selections of the evaluation metric value may be called different evaluation criteria. The evaluation criteria are: when the first evaluation metric value is a first noise variance and the second evaluation metric value is a second noise variance, the smaller one of the first noise variance and the second noise variance is the evaluation metric value, that is, a predicted value corresponding to the smaller one of the first noise variance and the second noise variance is the second information obtained after the second modulated signal is demodulated; when the first evaluation metric value is a first mean square error and the second evaluation metric value is a second mean square error, the smaller one of the first mean square error and the second mean square error is the evaluation metric value, that is, a predicted value corresponding to the smaller one of the first mean square error and the second mean square error is the second information obtained after the second modulated signal is demodulated; when the first evaluation metric value is a first noise ratio and the second evaluation metric value is a second noise ratio, the larger one between the first noise ratio and the second noise ratio is the evaluation metric value, that is, a predicted value corresponding to the larger one between the first noise ratio and the second noise ratio is selected as the second information obtained after the second modulated signal is demodulated.

Step 304: The mobile terminal decodes the first information and the second information to obtain a downlink data block.

Before modulating the data, the network side of the communication system performs channel coding processing on the information. Therefore, after a receiver demodulates the modulated signal into the first information and the second information, the receiver needs to decode the first information and the second information to obtain a raw downlink data block.

In the embodiment of the present disclosure, a mobile terminal receives an aggregate modulated signal, where the aggregate modulated signal includes a first modulated signal and a second modulated signal; the mobile terminal detects and obtains a first symbol rate and a first modulation mode of the first modulated signal, and demodulates the first modulated signal according to the first modulation mode and the first symbol rate to obtain first information; the mobile terminal detects and obtains a second symbol rate and a second modulation mode of the second modulated signal, and demodulates the second modulated signal according to the second modulation mode and the second symbol rate to obtain second information; and the mobile terminal decodes the first information and the second information to obtain a downlink data block. Therefore, with the present disclosure, the capability of sending downlink data is maximized while a USF compatibility between more types of low-capability mobile terminals is considered, thereby increasing throughput of downlink data.

Figure 4:
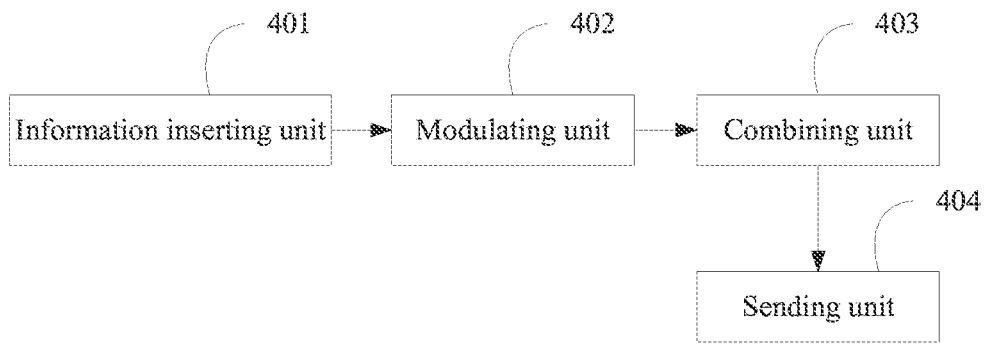
FIG. 4 is a schematic diagram of an apparatus for sending a downlink data block of a packet data service according to an embodiment of the present disclosure.

FIG. 4 is a schematic diagram of an apparatus for sending a downlink data block of a packet data service according to an embodiment of the present disclosure. As shown in FIG. 4, this embodiment includes the following units:

an information inserting unit 401, configured to add indication information of a data information modulation mode to a downlink data block, where the downlink data block includes first information and second information.

Bit errors easily occur during the transmission of digital signals, so that illegible characters occur on a receiver. Therefore, a network side of the communication system performs channel coding processing on digital code streams to ensure that the system has a specific error correction capability and anti-interference capability, which may greatly avoid the occurrence of bit errors in the code streams.

In the embodiment of the present disclosure, in a channel coding process, the information inserting unit 401 also inserts indication information of a data information modulation mode into code output information. The receiver may detect types of modulation modes used by the data information according to the indication information of the data information modulation mode.

After encoding the downlink data block, the network side of the communication system inserts successive training sequence information in the middle of the first information to form an initial Burst pulse sequence structure.

The first information refers to information that does not need to be pre-processed, where the pre-processing refers to inverse discrete Fourier transform IDFT (Inverse Discrete Fourier Transform) processing or inverse discrete cosine transform IDCT (Inverse Discrete Cosine Transform) processing or inverse discrete wavelet transform IDWT (Inverse Discrete Wavelet Transform) processing. This embodiment is based on the inverse discrete Fourier transform processing. Because the Fourier transform refers to transform from a frequency domain to a time domain, signals before being pre-processed may be called frequency domain signals, and signals after being transformed are called time domain signals. The purpose of pre-processing is to transform frequency domain signals into time domain signals. The first information is time domain signals, and thus does not need to be pre-processed. The first information is located in the middle of the Burst structure, including uplink state flag USF information and stealing flag SF information, and further including Header information. The first information is mainly used to carry the uplink state flag information. Therefore, a first modulation mode used by the first information is determined according to a capability of a mobile terminal scheduled by the USF information. If the mobile terminal scheduled by the USF information is an EGPRS terminal, the first modulation mode may be an 8PSK modulation mode, that is, 3-bit information is transmitted in a symbol period, which is indicated by three rows of data in the figure. The first information further includes training sequence TS information. In the middle of the first information, that is, a position indicated by black lines in the middle of FIG. 2, the training sequence TS information occupies positions of 26 or 31 symbols. Because the position of the training sequence (TS) information in the Burst structure is easily described, the position of the training sequence is not indicated in FIG. 2.

Preferentially, the first information may also include indication information of a second modulation mode. The indication information of the second modulation mode may be placed at the position of the first information completely, that is, in the middle of the Burst structure; the indication information of the second modulation mode may also be placed at the position of the second information completely, that is, at both sides of the Burst structure; or one part of the indication information may be placed at the position of the first information, and the other part may be placed at the position of the second information.

The second information refers to information to be pre-processed and is located on the left and right sides of the Burst structure, including downlink Data information, Padding information, supplementary bits Mbit information, and indication information I of the second modulation mode. The second information is mainly used to carry the data information, and thus the second modulation mode is determined according to a capability of a mobile terminal corresponding to the downlink data. If the home mobile terminal of the data information is a PGE2 mobile terminal, the second modulation mode may be 16QAM, 32QAM, and 64QAM. In FIG. 2, the modulation mode used by the second information may be 32QAM modulation mode, that is, 5-bit information is transmitted in a symbol period, which is indicated by five rows of data in FIG. 2.

In addition, the second information may further include the Header information.

a modulating unit 402, configured to perform symbol mapping processing on the first information by using the first modulation mode to obtain a first modulated signal and perform symbol mapping processing on the second information by using the second modulation mode and further perform data pre-processing to obtain a second modulated signal, where the indication information is used to indicate the second modulation mode.

The first modulation mode is determined according to the capability of the mobile terminal scheduled by the uplink state flag USF information; if the mobile terminal scheduled by the USF information is an EGPRS terminal, the first modulation mode may be an 8PSK modulation mode. When the first modulation mode is the 8 phase shift keying 8PSK mode, the network side of the communication system performs symbol mapping on the first information by using the 8PSK modulation mode, and modulates the first information into an 8PSK symbol. Because the amplitude of the 8PSK symbol is not constant, after performing symbol mapping on the first information, the network side of the communication system only needs to perform symbol rotation on the 8PSK symbol to avoid a vibrant amplitude change. After symbol mapping and symbol rotation processing are performed on the first information, a first modulated signal is obtained.

The second modulation mode is determined according to the capability of the home mobile terminal of the data information. This embodiment is based on an assumption that the second modulation mode is quadrature amplitude modulation 32QAM mode. The network side of the communication system performs symbol mapping on the second information by using the 32QAM modulation mode; after transforming the second information into a 32QAM symbol, the network side of the communication system further performs data pre-processing on the 32QAM symbol. This pre-processing mode may be inverse discrete Fourier transform, inverse discrete cosine transform, or inverse discrete wavelet transform. This embodiment is based on the inverse discrete Fourier transform. Because the inverse discrete Fourier transform is a transform from a frequency domain to a time domain, signals before the pre-processing are called frequency domain signals, while signals after being transformed are called time domain signals. The pre-processing process refers to: a frequency domain signal is transformed into a time domain signal; cyclic prefix (CP) information of a certain length is added to the obtained time domain signal to obtain a second modulated signal. The purpose of adding the cyclic prefix information is to overcome inter-symbol interference due to a channel extension.

The modulating unit 402 may use the following two methods to perform inverse discrete Fourier transform processing on the second information obtained after performing symbol mapping processing and insert the cyclic prefix CP information: one method is performing inverse discrete Fourier transform processing on the left and right parts, that is, positions of symbols 0 to 52 and positions of symbols 69 to 121 in the Burst structure of DAS8-9 mode illustrated in FIG. 2, of the second information that has undergone the symbol mapping processing, and inserting the cyclic prefix CP information to the left and right parts respectively; the second method is performing inverse discrete Fourier transform processing on the left and right parts of the second information that has undergone the symbol mapping processing together, and inserting the cyclic prefix CP information to the left and right parts of the second information respectively.

a combining unit 403, configured to combine the first modulated signal and the second modulated signal to obtain an aggregate modulated signal.

After combining the first modulated signal and the second modulated signal, the network side of the communication system adds guard period GP information and performs pulse forming. The purpose of inserting the guard period information is to provide a certain time interval for a handset or the network to increase and reduce power at the boundary of the Burst structure.

a sending unit 404, configured to send the aggregate modulated signal.

For the first modulated signal and the second modulated signal in the aggregate modulated signal, the network side of the communication system may send them by using different symbol rates. The network side of the communication system sends the first modulated signal that has undergone the pulse forming in the aggregate modulated signal by using a first symbol rate, and sends the second modulated signal that has undergone the pulse forming in the aggregate modulated signal by using a second symbol rate.

The first symbol rate is determined according to the symbol rate support capability of the mobile terminal scheduled by the uplink state flag information, and the second symbol rate is determined according to the symbol rate support capability of the mobile terminal corresponding to the data information. The first symbol rate and the second symbol rate may be the same.

In the embodiment of the present disclosure, a network side of the communication system adds indication information of a data information modulation mode to a downlink data block, where the downlink data block includes first information and second information; the network side of the communication system performs symbol mapping processing on the first information by using a first modulation mode to obtain a first modulated signal; the network side of the communication system performs symbol mapping processing on the second information by using a second modulation mode and further performs data pre-processing to obtain a second modulated signal, where the indication information is used to indicate the second modulation mode for a mobile terminal; the network side of the communication system combines the first modulated signal and the second modulated signal to obtain an aggregate modulated signal; and the network side of the communication system sends the aggregate modulated signal. Therefore, with the present disclosure, the capability of sending downlink data is maximized while USF compatibility between more types of low-capability mobile terminals is considered, thereby increasing throughput of downlink data.

Figure 5:
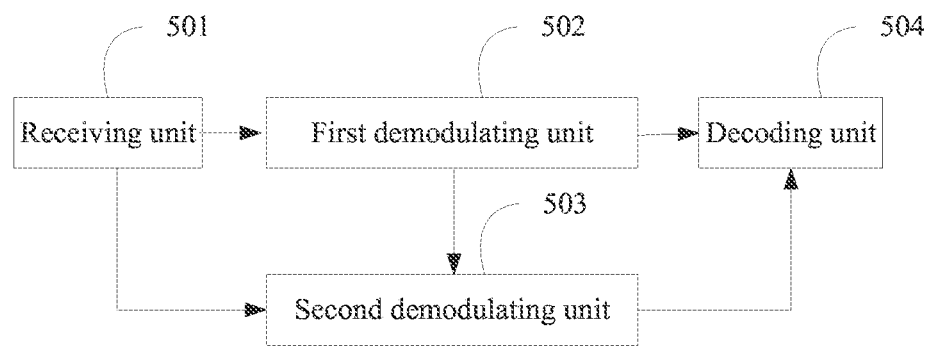
FIG. 5 is a schematic diagram of an apparatus for receiving a downlink data block of a packet data service according to an embodiment of the present disclosure.

The forgoing embodiment describes the apparatus for sending a downlink data block of the network, while the following describes an apparatus for receiving a downlink data block of a mobile terminal FIG. 5 is a schematic diagram of an apparatus for receiving a downlink data block of a packet data service according to an embodiment of the present disclosure. As shown in FIG. 5, this embodiment includes the following units:

a receiving unit 501, configured to receive an aggregate modulated signal, where the aggregate modulated signal includes a first modulated signal and a second modulated signal;

a first demodulating unit 502, configured to detect and obtain a first symbol rate and a first modulation mode of the first modulated signal, and demodulate the first modulated signal according to the first modulation mode and the first symbol rate to obtain first information.

The first demodulating unit 502 is specifically configured to blindly detect a first symbol rate and a first modulation mode of the first modulated signal according to training sequence information in the first modulated signal.

The first demodulating unit 502 may blindly detect a first symbol rate and a first modulation mode of the first modulated signal according to training sequence information in the first modulated signal; and demodulate the first modulated signal according to the obtained first modulation mode and first symbol rate to obtain first information.

a second demodulating unit 503, configured to detect and obtain a second symbol rate and a second modulation mode of the second modulated signal, and demodulate the second modulated signal according to the second modulation mode and the second symbol rate to obtain second information.

The second demodulating unit 503 is specifically configured to: demodulate the second modulated signal by using a symbol rate and a corresponding demodulation mode to obtain a first predicted value of the second information; demodulate the second modulated signal by using another symbol rate and a corresponding demodulation mode to obtain a first predicted value of the second information; obtain a first evaluation metric value according to the first predicated value, a first frequency domain signal, and a first frequency domain channel factor; and obtain a second evaluation metric value according to the second predicated value, the another frequency domain signal, and the another frequency domain channel factor; compare the first evaluation metric value and the second evaluation metric value to obtain an evaluation metric value, where a predicted value corresponding to the evaluation metric value is second information.

The comparing the first evaluation metric value and the second evaluation metric value to obtain an evaluation metric value is specifically as follows: When the first evaluation metric value is a first noise variance and the second evaluation metric value is a second noise variance, the smaller one of the first noise variance and the second noise variance is the evaluation metric value; when the first evaluation metric value is a first mean square error and the second evaluation metric value is a second mean square error, the smaller one of the first mean square error and the second mean square error is the evaluation metric value; and when the first evaluation metric value is a first noise ratio and the second evaluation metric value is a second noise ratio, the larger one between the first noise ratio and the second noise ratio is an evaluation metric value.

a decoding unit 504, configured to decode the first information and the second information to obtain a downlink data block.

Before modulating the data, the network side of the communication system performs channel coding processing on the information. Therefore, after the decoding unit 504 in a receiver demodulates the modulated signal into the first information and the second information, the decoding unit 504 needs also to perform decoding processing to obtain a raw downlink data block.

In the embodiment of the present disclosure, a mobile terminal receives an aggregate modulated signal, where the aggregate modulated signal includes a first modulated signal and a second modulated signal; the mobile terminal detects and obtains a first symbol rate and a first modulation mode of the first modulated signal, and demodulates the first modulated signal according to the first modulation mode and the first symbol rate to obtain first information; the mobile terminal detects and obtains a second symbol rate and a second modulation mode of the second modulated signal, and demodulates the second modulated signal according to the second modulation mode and the second symbol rate to obtain second information; and the mobile terminal decodes the first information and the second information to obtain a downlink data block. Therefore, with the present disclosure, the capability of sending downlink data is maximized while USF compatibility between more types of low-capability mobile terminals is considered, thereby increasing throughput of downlink data.

Persons skilled in the art may be further aware that units and steps provided in each embodiment disclosed in this specification may be implemented by electronic hardware, computer software or combination thereof. To describe the interchangeability between hardware and software clearly, components and steps of each embodiment are already described in the foregoing descriptions according to the function commonalities. Whether these functions are executed by hardware or software depends on specific applications and design constraints of the technical solution. Those skilled in the art may implement the described functions of each specific application by using different methods, but this implementation should not depart from the scope of the present disclosure.

The steps of the method or algorithm according to the embodiments disclosed here may be implemented by hardware or a software module executed by a processor, or implemented by a combination thereof. The software module may be stored in a random access memory (RAM), a read-only memory (ROM), an electrically programmable ROM, an electrically erasable programmable ROM, a register, a hard disk, a removable magnetic disk, a CD-ROM or any other forms of storage medium in this field.

The foregoing specific embodiments further describe the objectives, technical solutions, and benefits of the present disclosure in detail. It should be understood that the foregoing descriptions are merely specific embodiments of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A method for sending a downlink data block of a packet data service, comprising:
    adding indication information of a data information modulation mode to the downlink data block, wherein the downlink data block comprises first information and second information, wherein the first information comprises uplink state flag information and training sequence information, and wherein the second information comprises data information;
    performing symbol mapping processing on the first information by using a first modulation mode to obtain a first modulated signal; and performing symbol mapping processing on the second information by using a second modulation mode and further performing data pre-processing to obtain a second modulated signal, wherein the indication information is used to indicate the second modulation mode, wherein the first modulation mode is determined according to a modulation and coding capability of a mobile terminal scheduled by the uplink state flag information, and wherein the second modulation mode is determined according to a modulation and coding capability of a mobile terminal corresponding to the data information;
    combining the first modulated signal and the second modulated signal to obtain an aggregate modulated signal; and
    sending the aggregate modulated signal.

2. The method for sending the downlink data block of the packet data service according to claim 1, wherein the sending the aggregate modulated signal is specifically:
    sending, by using a first symbol rate, the first modulated signal that has experienced pulse forming in the aggregate modulated signal; and sending, by using a second symbol rate, the second modulated signal that has experienced pulse forming in the aggregate modulated signal.

3. The method for sending the downlink data block of the packet data service service according to claim 1, wherein the performing data pre-processing on the second information that has experienced the symbol mapping processing is specifically: performing inverse discrete Fourier transform processing on the second information that has undergone the symbol mapping processing, and inserting cyclic prefix (CP) information.

4. The method for sending the downlink data block of the packet data service according to claim 1, wherein the indication information is comprised in the first information; or the indication information is comprised in the second information; or one part of the indication information is comprised in the first information and the other part of the indication information is comprised in the second information.

5. The method for sending the downlink data block of the packet data service according to claim 2, wherein the first symbol rate is determined according to a symbol rate support capability of a mobile terminal scheduled by uplink state flag information; and the second modulation mode is determined according to a symbol rate support capability of a mobile terminal corresponding to data information.

6. A method for sending a downlink data block of a packet data service, comprising:
receiving an aggregate modulated signal, wherein the aggregate modulated signal comprises a first modulated signal and a second modulated signal;
detecting and obtaining a first symbol rate and a first modulation mode of the first modulated signal, and demodulating the first modulated signal according to the first modulation mode and the first symbol rate to obtain first information;
detecting and obtaining a second symbol rate and a second modulation mode of the second modulated signal, and demodulating the second modulated signal according to the second modulation mode and the second symbol rate to obtain second information; and
decoding the first information and the second information to obtain the downlink data block;
wherein the first information comprises uplink state flag information and training sequence information; and
wherein the second information comprises data information.

7. The method for receiving the downlink data block of the packet data service according to claim 6, wherein the detecting and obtaining a second symbol rate and a second modulation mode of the second modulated signal, and demodulating the second modulated signal according to the second modulation mode and the second symbol rate to obtain second information is specifically:
demodulating the second modulated signal by using a symbol rate and a corresponding demodulation mode to obtain a first predicted value of the second information;
demodulating the second modulated signal by using another symbol rate and a corresponding demodulation mode to obtain a second predicted value of the second information;
obtaining a first evaluation metric value according to the first predicated value, a first frequency domain signal, and a first frequency domain channel factor; and obtaining a second evaluation metric value according to the second predicated value, another frequency domain signal, and another frequency domain channel factor; and
comparing the first evaluation metric value and the second evaluation metric value to obtain an evaluation metric value, wherein a predicted value corresponding to the evaluation metric value is the second information.

8. The method for receiving the downlink data block of the packet data service according to claim 7, wherein the comparing the first evaluation metric value and the second evaluation metric value to obtain an evaluation metric value is specifically:

when the first evaluation metric value is a first noise variance and the second evaluation metric value is a second noise variance, the smaller one of the first noise variance and the second noise variance is the evaluation metric value;
when the first evaluation metric value is a first mean square error and the second evaluation metric value is a second mean square error, the smaller one of the first mean square error and the second mean square error is the evaluation metric value; and
when the first evaluation metric value is a first noise ratio and the second evaluation metric value is a second noise ratio, the larger one between the first noise ratio and the second noise ratio is the evaluation metric value.

9. An apparatus for sending a downlink data block of a packet data service, comprising:
a transmitter;
a processor connected to the transmitter; and
a non-transitory computer readable medium connected to the processor and having instructions stored thereon that, when executed by the processor, cause the apparatus to:
add indication information of a data information modulation mode to the downlink data block, wherein the downlink data block comprises first information and second information, wherein the first information comprises uplink state flag information and training sequence information, and wherein the second information comprises data information;
perform symbol mapping processing on the first information by using a first modulation mode to obtain a first modulated signal;
perform symbol mapping processing on the second information by using a second modulation mode;
perform data pre-processing to obtain a second modulated signal, wherein the indication information is used to indicate the second modulation mode; and
combine the first modulated signal and the second modulated signal to obtain an aggregate modulated signal;
wherein the transmitter is configured to send the aggregate modulated signal;
wherein the first modulation mode is determined according to a modulation and coding capability of a mobile terminal scheduled by the uplink state flag information; and
wherein the second modulation mode is determined according to a modulation and coding capability of a mobile terminal corresponding to the data information.

10. The apparatus for sending the downlink data block of the packet data service according to claim 9, wherein the transmitter is further configured to:
send, by using a first symbol rate, the first modulated signal that has experienced pulse forming in the aggregate modulated signal; and
send, by using a second symbol rate, the second modulated signal that has experienced pulse forming in the aggregate modulated signal.

11. The apparatus for sending the downlink data block of the packet data service according to claim 9, wherein the non-transitory computer readable medium further has instructions stored thereon that, when executed by the processor, cause the apparatus to perform inverse discrete Fourier transform processing on the second information that has experienced the symbol mapping processing, and insert cyclic prefix information.

12. The apparatus for sending the downlink data block of the packet data service according to claim 9, wherein the indication information is comprised in the first information; or the indication information is comprised in the second information; or one part of the indication information is comprised in the first information and the other part of the indication information is comprised in the second information.

13. The apparatus for sending the downlink data block of the packet data service according to claim 10, wherein the first symbol rate is determined according to a symbol rate support capability of a mobile terminal scheduled by uplink state flag and the second modulation mode is determined according to a symbol rate support capability of a mobile terminal corresponding to data information.

14. An apparatus for receiving a downlink data block of a packet data service, comprising:
a receiver configured to receive an aggregate modulated signal, wherein the aggregate modulated signal comprises a first modulated signal and a second modulated signal;
a processor connected to the receiver; and
a non-transitory computer readable medium connected to the processor and having instructions stored thereon that, when executed by the processor, cause the apparatus to:
detect and obtain a first symbol rate and a first modulation mode of the first modulated signal;
demodulate the first modulated signal according to the first modulation mode and the first symbol rate to obtain first information;
detect and obtain a second symbol rate and a second modulation mode of the second modulated signal;
demodulate the second modulated signal according to the second modulation mode and the second symbol rate to obtain second information; and
decode the first information and the second information to obtain the downlink data block;
wherein the first information comprises uplink state flag information and training sequence information; and
wherein the second information comprises data information.

15. The apparatus for receiving the downlink data block of the packet data service according to claim 14, wherein the instructions causing the apparatus to detect and obtain a second symbol rate and a second modulation mode of the second modulated signal and demodulate the second modulated signal comprise instructions, that when executed by the processor, cause the apparatus to:
demodulate the second modulated signal by using a symbol rate and a corresponding demodulation mode to obtain a first predicted value of the second information;
demodulate the second modulated signal by using another symbol rate and a corresponding demodulation mode to obtain a second predicted value of the second information;
obtain a first evaluation metric value according to the first predicated value, a first frequency domain signal, and a first frequency domain channel factor; and obtain a second evaluation metric value according to the second predicated value, another frequency domain signal, and another frequency domain channel factor; and
compare the first evaluation metric value and the second evaluation metric value to obtain an evaluation metric value, wherein a predicted value corresponding to the evaluation metric value is the second information.

16. The apparatus for receiving the downlink data block of the packet data service according to claim 15, wherein, when the first evaluation metric value is a first noise variance and the second evaluation metric value is a second noise variance, the smaller one of the first noise variance and the second noise variance is the evaluation metric value;
wherein, when the first evaluation metric value is a first mean square error and the second evaluation metric value is a second mean square error, the smaller one of the first mean square error and the second mean square error is the evaluation metric value; and
wherein, when the first evaluation metric value is a first noise ratio and the second evaluation metric value is a second noise ratio, the larger one between the first noise ratio and the second noise ratio is the evaluation metric value.

* * * * *

UNITED STATES PATENT AND TRADEMARK OFFICE
CERTIFICATE OF CORRECTION

PATENT NO. : 9,363,807 B2  
APPLICATION NO. : 14/308216  
DATED : June 7, 2016  
INVENTOR(S) : Chao Luo Page 1 of 1

It is certified that error appears in the above-identified patent and that said Letters Patent is hereby corrected as shown below:

Claims

In Col. 16, line 64, claim 3, delete "data service service" and insert --data service--.

Signed and Sealed this
Twenty-sixth Day of July, 2016

Michelle K. Lee
*Director of the United States Patent and Trademark Office*